United States Patent
Asada et al.

(10) Patent No.: US 12,479,525 B2
(45) Date of Patent: Nov. 25, 2025

(54) WALL CLIMBING VEHICLES WITH ADAPTABLE MAGNETIC WHEELS

(71) Applicants: MASSACHUSETTS INSTITUTE OF TECHNOLOGY, Cambridge, MA (US); SUMITOMO HEAVY INDUSTRIES, LTD., Tokyo (JP)

(72) Inventors: Haruhiko Harry Asada, Lincoln, MA (US); Haruhiko Eto, Kanagawa (JP)

(73) Assignees: SUMITOMO HEAVY INDUSTRIES, LTD., Tokyo (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 433 days.

(21) Appl. No.: 18/058,805

(22) Filed: Nov. 25, 2022

(65) Prior Publication Data

US 2023/0087850 A1    Mar. 23, 2023

Related U.S. Application Data

(63) Continuation of application No. PCT/US2021/033977, filed on May 25, 2021.
(Continued)

(51) Int. Cl.
*B62D 57/024*  (2006.01)
*B60B 19/00*   (2006.01)

(52) U.S. Cl.
CPC .......... *B62D 57/024* (2013.01); *B60B 19/006* (2013.01)

(58) Field of Classification Search
CPC .... B62D 57/024; B62D 9/002; B62D 55/265; B60B 19/006
(Continued)

(56) References Cited

U.S. PATENT DOCUMENTS

| 5,220,869 A | 6/1993 | Pelrine et al. |
| 5,388,528 A * | 2/1995 | Pelrine ................ F16L 55/32 |
| | | 301/5.1 |

(Continued)

FOREIGN PATENT DOCUMENTS

| CN | 104494721 | 4/2015 |
| CN | 107226146 | 10/2017 |

(Continued)

OTHER PUBLICATIONS

International Search Report for PCT/US2021/033977 mailed on Sep. 2, 2021.

*Primary Examiner* — Hau V Phan
(74) *Attorney, Agent, or Firm* — IPUSA, PLLC

(57) ABSTRACT

A vehicle may include a chassis, at least one wheel rotatably coupled to the chassis, and a magnet positioning inside of the at least one wheel. The magnet may be rotatably coupled to the wheel with a first shaft, such that the magnet is rotatable about a first axis. In some instances, the magnet may also be coupled to the first shaft with a second shaft, such that the magnet is rotatable relative to the wheel about a second axis. Accordingly, the magnet may have either one or two degrees of freedom of movement within the at least one wheel. The magnet may rotate passively, actively, or semi-actively in one or more directions to provide an attractive force toward a ferromagnetic surface to secure the vehicle to the ferromagnetic surface.

20 Claims, 15 Drawing Sheets

Related U.S. Application Data

(60) Provisional application No. 63/032,563, filed on May 30, 2020.

(58) Field of Classification Search
USPC .......................................................... 180/55
See application file for complete search history.

(56) References Cited

U.S. PATENT DOCUMENTS

| | | | | |
|---|---|---|---|---|
| 6,011,455 | A * | 1/2000 | Higuti | B62D 57/024 |
| | | | | 335/223 |
| 7,958,955 | B2 * | 6/2011 | Moser | B62D 55/265 |
| | | | | 180/8.5 |
| 8,820,850 | B2 * | 9/2014 | Moser | B60B 33/08 |
| | | | | 301/5.1 |
| 9,487,254 | B2 * | 11/2016 | Rochat | B62D 57/024 |
| 2005/0023052 | A1 * | 2/2005 | Beck | B60K 7/0007 |
| | | | | 180/24.07 |
| 2016/0325794 | A1 * | 11/2016 | Baur | B62D 57/024 |
| 2018/0370279 | A1 * | 12/2018 | Reboredo Losada | B61C 15/04 |
| 2019/0291793 | A1 * | 9/2019 | Johnson | B62D 55/02 |
| 2020/0023915 | A1 * | 1/2020 | Danko | B62D 57/024 |
| 2020/0172184 | A1 * | 6/2020 | Abdellatif | B62D 9/002 |

FOREIGN PATENT DOCUMENTS

| | | |
|---|---|---|
| CN | 110562344 | 12/2019 |
| CN | 111204379 | 5/2020 |
| JP | 5633491 | 12/2014 |

\* cited by examiner

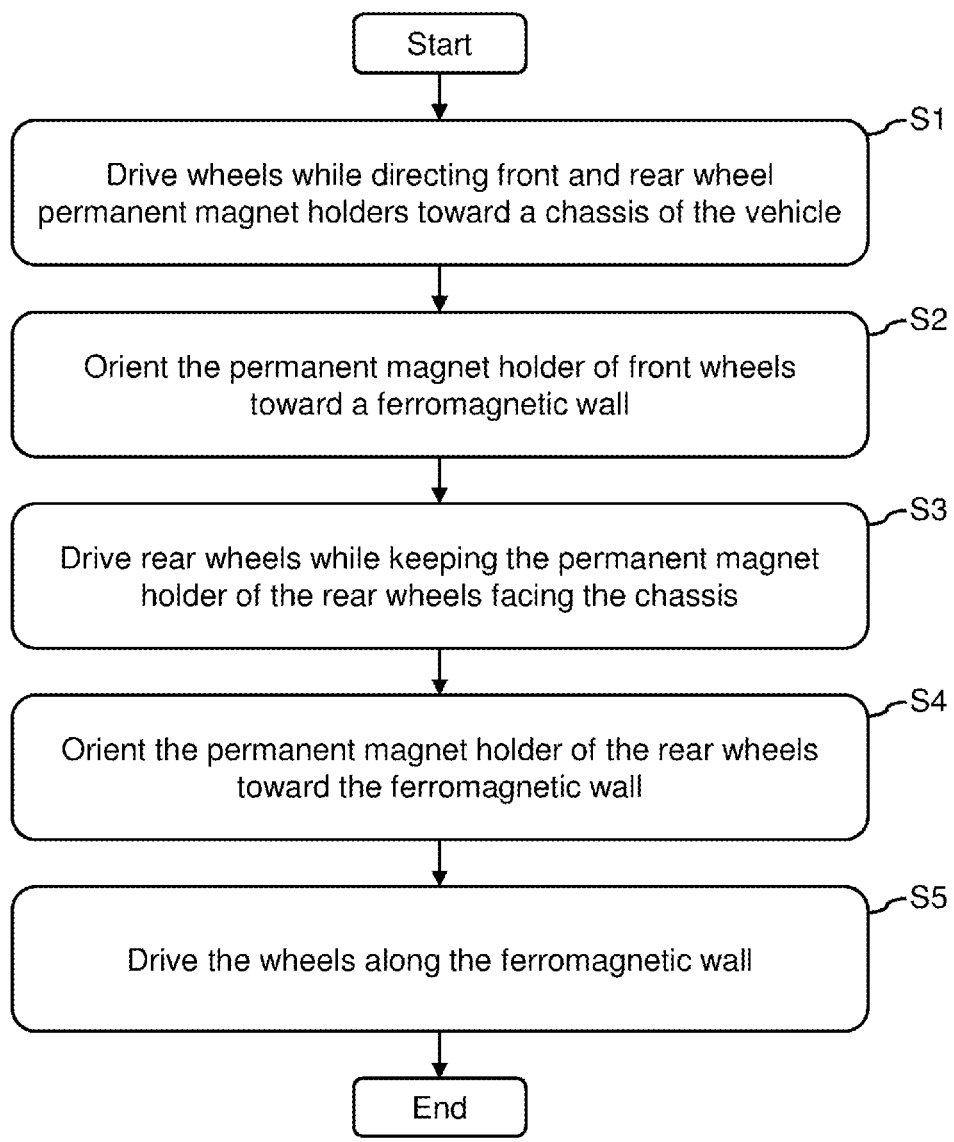

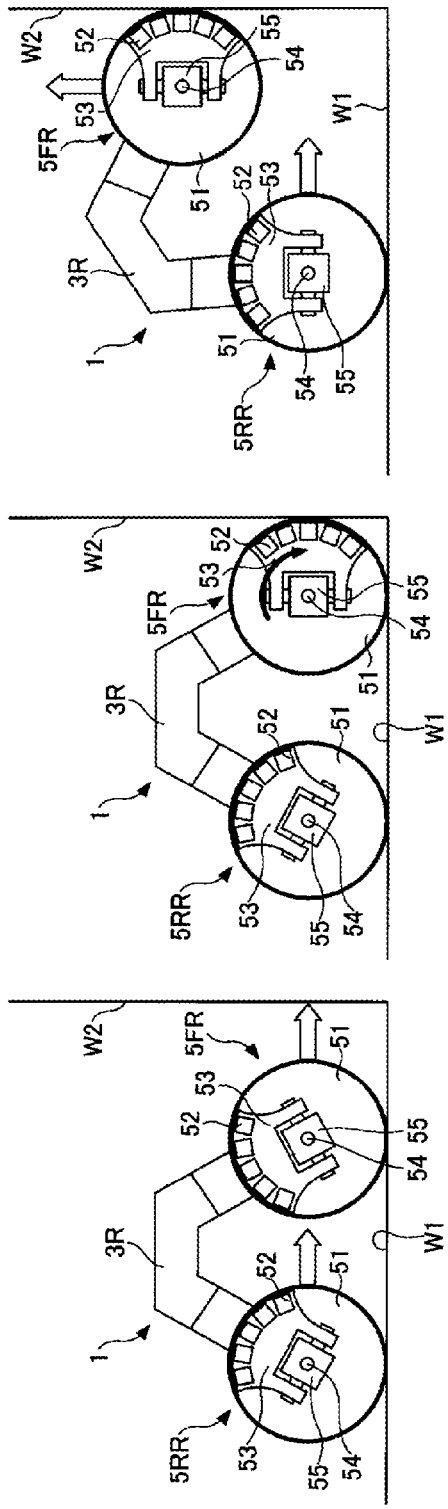

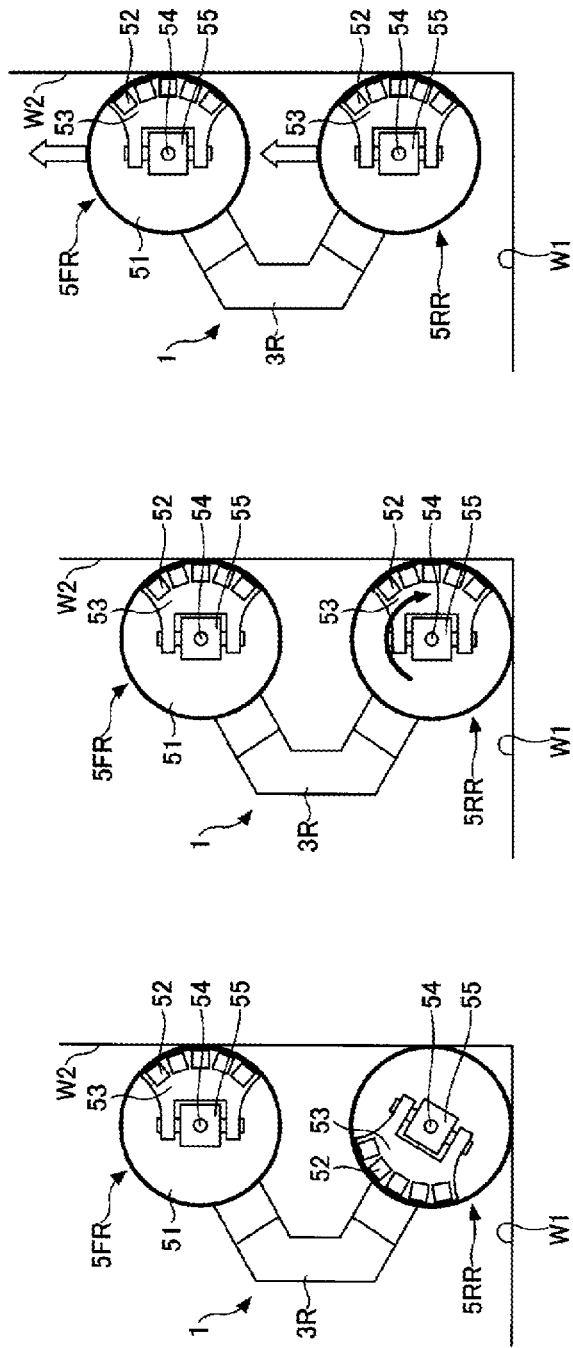

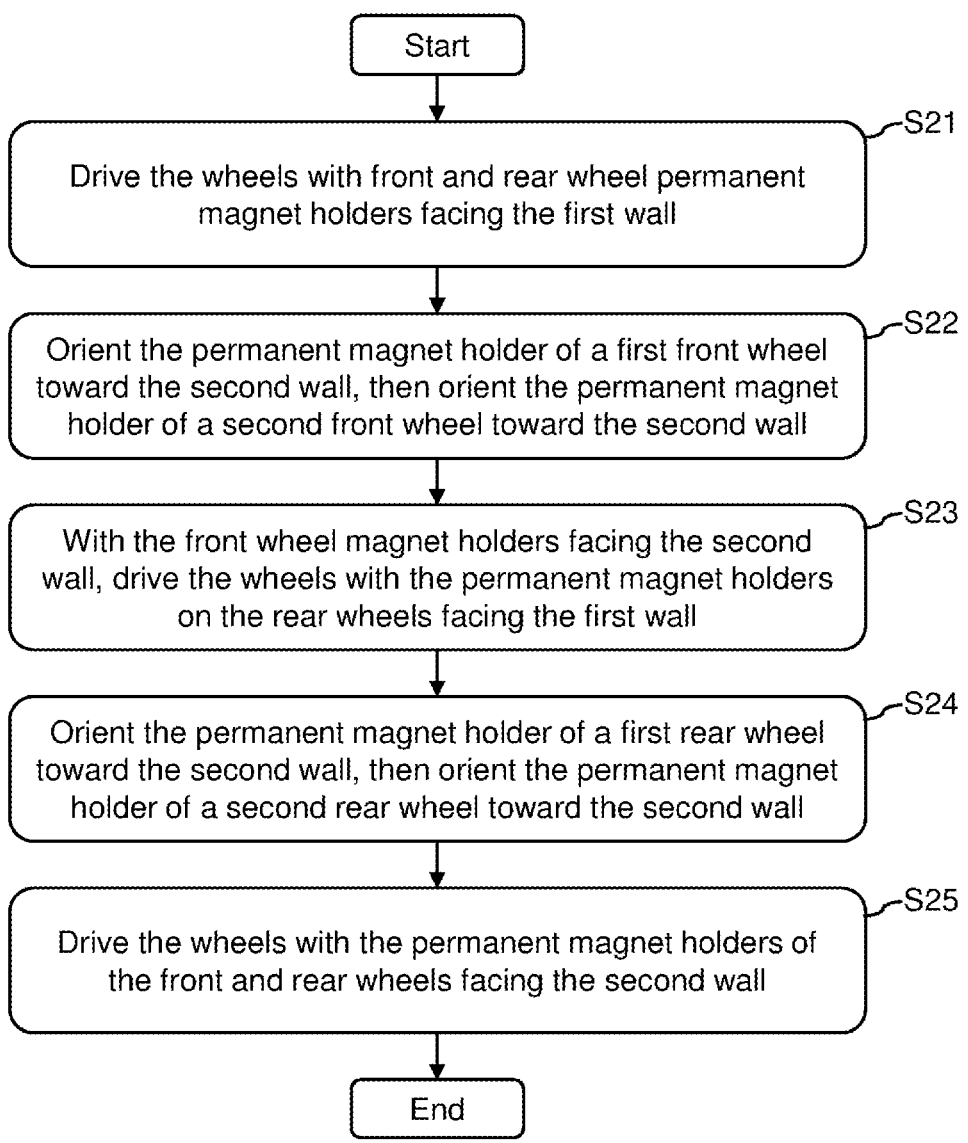

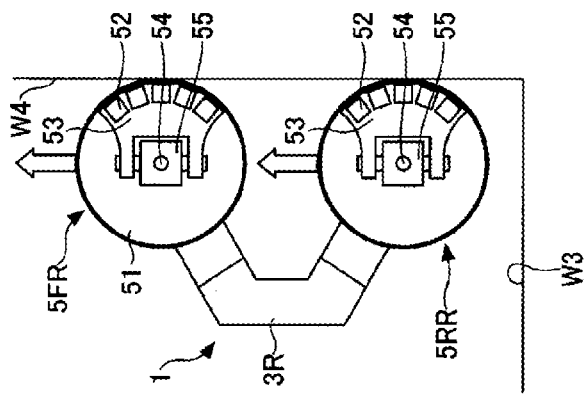
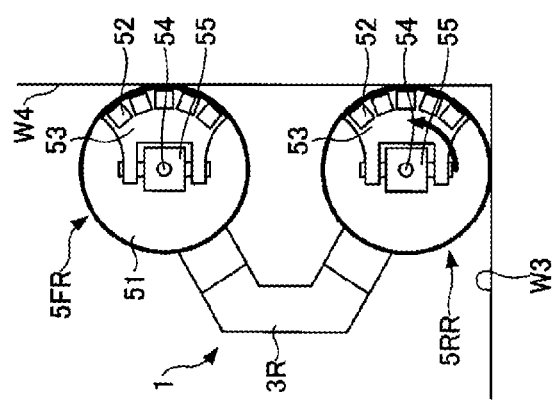
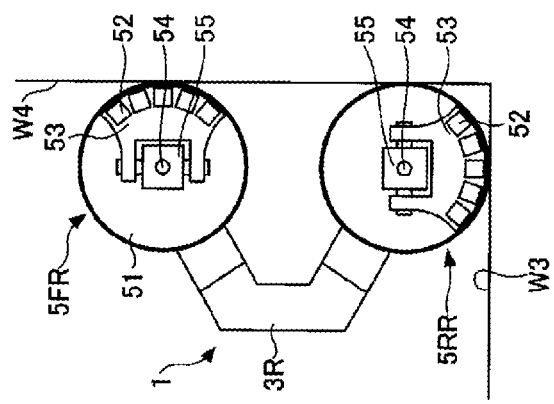

WALL CLIMBING VEHICLES WITH ADAPTABLE MAGNETIC WHEELS

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/US2021/033977, filed on May 25, 2021, and designating the U.S., which claims the benefit of under 35 U.S.C. § 119(e) of U.S. provisional application Ser. No. 63/032,563, filed May 30, 2020. The entire contents of the foregoing applications are incorporated herein by reference.

FIELD

Disclosed embodiments are related to adaptable magnetic wheels and wall-climbing vehicles having said magnetic wheels, as well as related methods of use.

BACKGROUND

At manufacturing sites such as shipbuilding and large cranes, vehicles with the ability to climb large curved steel surfaces are known to be used for welding, painting, and visual inspection. Various locomotion and attraction principles for wall-climbing tasks have been studied and developed for such tasks. For example, some conventional systems employ legged locomotion with negative pressure attraction mechanisms. Other conventional technologies include legged robots with bio-inspired (biomimetic) attraction mechanisms such as micro spines and fibrillar dry adhesives. Magnetic attraction forces have been employed for attraction when the wall material is ferromagnetic. For example, some conventional climbing robots include legs and electromagnets on each foot. These legged robots for welding, however, were designed for use on near-flat surfaces. Legged robots using other types of climbing methods include those with, for example, electro-adhesive pads and friction pads on end effectors of a multi-limbed robot used between two parallel walls.

SUMMARY

In some embodiments, a vehicle includes a chassis, at least one wheel rotatably coupled to the chassis, a wheel actuator coupled to the wheel and configured to selectively drive the wheel, and a magnet positioned inside of the at least one wheel. The magnet is rotatably coupled to the at least one wheel via a first magnet shaft such that the magnet is rotatable relative to the wheel about a first axis. The vehicle may also include a magnet actuator coupled to the first magnet shaft where the magnet actuator is configured to selectively adjust an angle of the magnet relative to the first axis.

In some embodiments, a vehicle includes a chassis, a suspension coupled to the chassis, at least one wheel rotatably coupled to the suspension, a wheel actuator coupled to the wheel and configured to selectively drive the wheel, and a magnet positioned inside of the at least one wheel. The magnet is rotatably coupled to the at least one wheel via a first magnet shaft such that the magnet is rotatable relative to the wheel about a first axis. The vehicle may also include a magnet actuator coupled to the first magnet shaft where the magnet actuator is configured to selectively adjust an angle of the magnet relative to the first axis.

In some embodiments, a method of operating a vehicle includes driving a plurality of wheels of the vehicle along a surface toward a wall orientated at an angle relative to the surface, orienting a front magnet positioned inside at least one front wheel of the plurality of wheels about a first front magnet axis in a direction orthogonal to the wall, driving at least one rear wheel of the plurality of wheels along the surface toward the wall, orienting a rear magnet positioned inside of the at least one rear wheel about a first rear magnet axis in a direction orthogonal to the wall, and driving the plurality of wheels of the vehicle along the wall.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 9 is a flowchart showing one embodiment of a method of operating a vehicle including adaptable magnetic ball-wheels;

FIGS. 10A-10F are schematic diagrams depicting a vehicle performing the steps of FIG. 9;

FIG. 11 is a flowchart showing another embodiment of a method of operating a vehicle including adaptable magnetic ball-wheels;

FIGS. 12A-12F are schematic diagrams depicting a vehicle performing the steps of FIG. 11.

DETAILED DESCRIPTION

Figure 1:
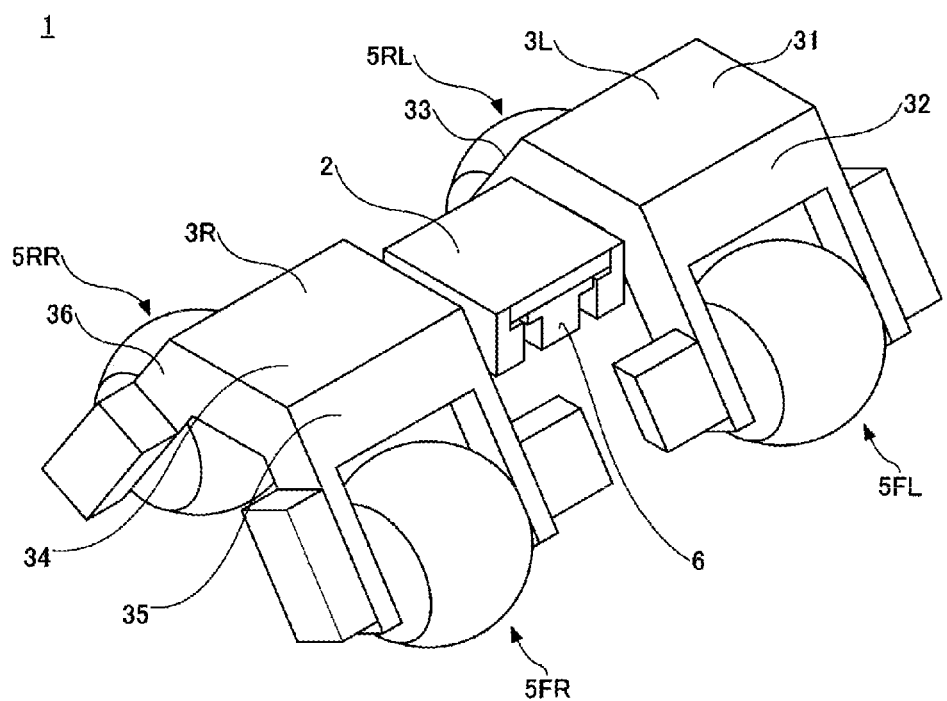
FIG. 1 is a perspective view of one embodiment of a vehicle including shape-adaptable magnetic ball-wheels.

Welding, among other tasks, is an important manufacturing process in heavy industries. Shipbuilding, for example, requires a number of welding operations. Conventional vehicles and robotic platforms have been impractical and difficult to use to accomplish these tasks owing to the complexity of the environment and the variety of workpieces. For example, commonly employed legged-type climbing vehicles can be compliant with uneven surfaces, but these types of vehicles have relatively low payload capability and structural rigidity compared to wheel-based climbing vehicles, and have a generally low travel speed and discontinuous motion. As another example, conventional vehicles have employed actively powered attraction systems such as vacuum pumps and electromagnets which are switch one or off to enable motion, resulting in power-intensive locomotion. These conventional vehicles have been designed for well-organized environments, which are approximately a straight shape or a uniformly curved surface relative to the vehicle size. However, there are many uneven workpieces in many manufacturing facilities. Because existing vehicles are not able to work on such workpieces due to their poor mobility, human workers are employed to work on scaffolds to perform a variety of tasks.

In view of the above, the inventors have recognized the benefits of a vehicle including wheels having internal permanent magnets that are freely rotatable relative to the wheels allowing for energy efficient locomotion on complex ferromagnetic surfaces. In particular, the inventors have recognized the benefits of a vehicle able to reliably move on surfaces of a three-dimensional (3D) object, including vertical or inverted surfaces, regardless of angle of inclination of the surface. According to exemplary embodiments described herein, a vehicle having adaptable magnetic wheels may provide enhanced mobility, payload capacity, and structural rigidity for a variety of industrial applications including the manufacturing of ferromagnetic structures like ships and storage tanks.

In some embodiments, a vehicle includes a chassis rotatably coupled to at least one wheel. The wheel may be coupled to a wheel actuator configured to drive the wheel along a surface. The wheel may also include a magnet positioned inside of the wheel, where the magnet is rotatably coupled to the wheel via a magnet shaft. In some embodiments, the magnet shaft may be parallel to an axis of rotation of the wheel. According to this embodiment, the magnet may rotate relative to the wheel in response to magnetic attraction between the magnet and an exterior ferromagnetic surface. The wheel may be formed of a non-ferromagnetic material, including, but not limited to, aluminum, polymers, plastics, and composites. Further, the wheel may be at least partially hollow in some embodiments to accommodate the presence of the one or more magnets positioned within a wheel. For example, in some embodiments, a wheel may be formed using a shell like structure where an outer shell may form at least a portion of a wheel with the one or more magnets contained within the wheel interior.

It should be understood that a wheel may have any appropriate shape for a desired application. For example, in some embodiments, a wheel may have a cylindrical shape, where a magnet having a single degree of freedom (i.e., about the magnet shaft) is moveable in a circumferential direction relative to the cylindrical wheel. In other embodiments, the wheel may have an at least partially spherical or otherwise curved shape to accommodate the presence of curved or otherwise uneven surfaces. In such an embodiment, the spherical shape may provide alternative contact points between the wheel and an underlying surface, especially where the surface is irregular or does not have a single pitch between multiple wheels of the vehicle. In such an embodiment, it may be beneficial for a magnet disposed within the wheel to be coupled to the wheel with a second magnet shaft disposed between the first magnet shaft and the magnet, such that the magnet is rotatable in two degrees of freedom relative to the wheel. In some embodiments, the first magnet shaft and second magnet shaft may be perpendicular to one another.

In some instances, it may be desirable to increase an amount of friction between a wheel and an adjacent surface. Thus, in some embodiments, a wheel may include an outer coating of a high friction material (e.g., EVA, rubber, etc.) that has a larger coefficient of friction than an underlying material of the wheel to assist with traction when in contact with a ferromagnetic surface.

According to some exemplary embodiments described herein, one or more magnets positioned inside of a wheel that are rotatable relative to the wheel in one or more degrees of freedom may rotate passively based on magnetic attraction between the magnet and an adjacent ferromagnetic surface. That is, the one or more magnets may passively orient themselves in a position closest to (i.e., perpendicular with) the ferromagnetic surface. Such a position may have a net zero magnetic torque, and may have a correspondingly high attractive force urging the wheel toward the ferromagnetic surface. In cases where a vehicle includes multiple wheels each having one or more internal rotatable magnets, each of the one or more magnets inside of each of the wheels may adjust passively and independently toward a perpendicular orientation with a ferromagnetic surface. The magnets may rotate passively in one or both of two degrees of freedom, such that consistent magnetic attraction force is maintained on complex 3D surfaces for each wheel.

In some embodiments, a vehicle including a wheel having an internal magnet rotatably coupled to the wheel may include a magnet actuator configured to actively position the magnet relative to the wheel. The magnet actuator may be a servomotor, DC motor, stepper motor, or another suitable actuator configured to rotate the magnet between one or more rotational positions. The magnet actuator may have a maximum output torque greater than a maximum magnetic torque generated by magnetic attraction between the internal magnet and an adjacent ferromagnetic surface. Accordingly, when adjacent to a ferromagnetic surface, the magnet actuator may rotate the internal magnet away from the ferromagnetic surface, thereby reducing or eliminating the magnetic attraction force urging the wheel toward the surface. Such an arrangement may be beneficial when transferring between discontinuous surfaces (e.g., perpendicular walls, floors, ceilings, etc.). When approaching a junction between two surfaces, a passively rotating magnet may be attracted to both surfaces simultaneously when a wheel is positioned at the junction. Accordingly, the internal magnet may resist transitioning between the two surfaces because magnetic attraction force still urges the wheel toward the original surface the vehicle was positioned on. In contrast, a vehicle employing a magnet actuator that controls an orientation of the rotating magnet in one or more degrees of freedom, the vehicle may be able to orient the magnet to the adjacent surface, thereby eliminating or substantially reducing the magnetic attraction force retaining the vehicle on the original surface. Accordingly, vehicles according to exemplary embodiments described herein may navigate perpendicular (90 degree) corners between various 3D surfaces. In some embodiments, an internal magnet may have sufficient magnetic torque to back-drive the actuator coupled to the internal magnet. In this embodiment, the internal magnet may still rotate passively to ensure consistent magnetic attraction force, and the actuator may only be powered and used to rotate the magnet in certain modes of the vehicle. In some embodiments, torque control may be employed, where in most modes the actuator is responsive to the magnetic torque and allows the magnet to move passively, only providing powered movement to cancel resistive forces associated with the transmission between the internal magnet and the actuator.

According to exemplary embodiments described herein, permanent magnets may be employed inside of a wheel to generate magnetic attraction forces allowing a vehicle to climb ferromagnetic surfaces. Such an arrangement may provide numerous benefits, including passive attraction where no active power draw is used to keep the vehicle adhered to a surface. In some embodiments, to provide strong magnetic attraction in a limited space, multiple magnets may be employed in an array. For example, multiple permanent magnets may be arranged in a Halbach array, allowing the side of the magnets facing a ferromagnetic surface to provide enhanced attraction relative to a single large magnet. In some embodiments, five neodymium iron boron magnets, or other types of magnets, may be arranged in an arc inside of a wheel of the vehicle. Of course, any suitable number and type of permanent magnet may be employed, as the present disclosure sis not so limited. Additionally, in some embodiments, electromagnets may be employed, as the present disclosure is not so limited.

In some cases, a vehicle may be tasked with navigating complex curved surfaces, junctions, or obstacles where traditional wheeled or legged vehicles may not be able to navigate, or may navigate inefficiently. Accordingly, the inventors have recognized the benefits of a vehicle that is compliant to an uneven surface while maintaining rigidity sufficient to function as a base for a variety of tools (e.g., a welding torch). In particular, the inventors have recognized the benefits of a suspension system coupled with one or more magnetic wheels that provides a stable platform adaptable to a variety of surface shapes.

In some embodiments, a vehicle may include a chassis and a suspension coupling a plurality of wheels to the chassis. The suspension may include a first rocker arm rotatably coupled to the chassis at a first pivot point, and a second rocker arm rotatably coupled to the chassis at a second pivot point. The first rocker arm and second rocker arm may be positioned on opposite sides of the chassis. Each of the first rocker arm and second rocker arm may be rotatably coupled to wheels which are positioned on opposing sides of the rocker arm relative to the respective pivot point. That is, the first pivot point may be positioned between a first wheel positioned at a first end of the first rocker arm and a second wheel positioned at a second opposite end of the first rocker arm. Likewise, the second pivot point may be positioned between a third wheel positioned at a first end of the second rocker arm and a fourth wheel positioned at a second opposite end of the second rocker arm. In this manner, as the vehicle traverses variable terrain, the rocker arms may rotate relative to the chassis such that each of the four wheels stays in contact with an underlying surface. A differential may couple the first rocker arm to the second rocker arm, such that the chassis maintains an average pitch angle between the two rocker arms. As the rocker arms may be sufficiently rigid and lack springs and/or dampers, the chassis may serve as a stable platform for a variety of tasks. Of course, in some embodiments, other suspensions including those with springs and/or dampers may be employed and such damped elastic suspensions may be well suited to some tasks, as the present disclosure is not so limited.

In some embodiments, a method of operating a vehicle according to exemplary embodiments described herein includes driving a plurality of wheels of the vehicle along a surface toward a wall orientated at an angle relative to the surface. The wall may be a vertical ferromagnetic wall and the surface may be a ground surface. Each wheel of the plurality of wheels may include an internal magnet which is rotatable relative to the wheel about a magnet axis. In some embodiments, as the wheels are driven along a ground surface located vertically beneath the vehicle relative to a local direction of gravity, magnets positioned inside each of the plurality of wheels may be oriented toward a chassis of the vehicle. That is, the magnets may be oriented away from the ground surface so that the magnets do not interfere with locomotion, as gravity is sufficient to adhere the vehicle to a ground surface. In some embodiments, the magnets may be oriented with actuators (e.g., servomotors) associated with each magnet. When the vehicle approaches the wall, the magnets inside of front wheels of the vehicle may be oriented in a direction orthogonal to the wall (i.e., so that the magnets are in a position closest to the wall). Accordingly, the front wheels of the vehicle may generate a magnetic attraction force sufficient to allow the front wheels to locomote along the wall. Rear wheels of the vehicle may be driven to move the front wheels up the wall until the rear wheels are adjacent the wall. Magnets positioned inside of the rear wheels may be oriented toward the wall to generate a magnetic attraction force toward the wall. Once the front and rear wheels are adhered to the wall, the vehicle may be able to locomote along the wall without further orientation of the magnets. In some embodiments, the magnets may move passively to remain orthogonal to the wall. That is, magnetic torque generated by the attraction force may be sufficient to back-drive the actuator or otherwise overcome resistive forces to ensure consistent attraction force for the vehicle. As discussed previously, in some embodiments the actuator may be unpowered to reduce resistive forces on the magnets. In some embodiments, the actuators may seek a torque-balance to effectively emulate passive movement of the magnet while canceling resistive forces.

In some cases, a vehicle according to exemplary embodiments described herein may move between two surfaces which are vertical or inverted (e.g., between two vertical walls or between a wall and ceiling). In such cases and in some embodiments, a method of operating the vehicle may be similar to that discussed immediately above when the vehicle is traversing a perpendicular junction between two such surfaces. During these transitions, the vehicle may maintain at least three points of contact at any given time during the transition between surfaces. Accordingly, the method may include first driving a plurality of wheels along the first surface until front wheels of the vehicle are adjacent a second surface. During this motion, magnets in each of the wheels may be oriented toward the first surface so as to provide sufficient magnetic attraction force to keep the vehicle on the surface. Once the front wheels are adjacent the second surface, a magnet in one of the front wheels may be oriented (e.g., with an actuator) toward the second surface, while magnets in the other front wheels are kept oriented toward the first surface. In this manner, during the transition for magnetic attraction three points of magnetic attraction are maintained between the vehicle and the first and second surface. Once one of the magnets is oriented to toward the second surface, other magnets of the front wheels may be oriented toward the second surface. The same process may be repeated for the rear wheels until the vehicle has transferred between the two surfaces. Thus, in this manner a vehicle may transfer magnetic attraction for each wheel sequentially so as to maintain as many magnetic attraction points as possible during a transfer between surfaces.

In some cases, a vehicle may traverse surfaces which vary in pitch and shape. Accordingly, the vehicle may include a suspension which allows one or more wheels to move relative to a vehicle chassis to accommodate variations in the surfaces and/or obstacles. In some embodiments, a method of operating a vehicle according to exemplary embodiments described herein includes rotating a first rocker arm and a second rocker arm in response to variations in the surfaces on which the vehicle is positioned. The first rocker arm and second rocker arm may be coupled to one another and the chassis with a differential, such that rotation of the first and second rocker arms results in a rotation of a chassis to an average angle between the first and second rocker arms. The rotation of the rocker arms may ensure each wheel of the vehicle stays in contact with the surface on which the vehicle is disposed for a wide range of surface shapes and obstacles. Of course, other suspensions may be employed, as the present disclosure is not so limited in this regard.

For the sake of clarity, adaptable magnetic ball-wheels are primarily described in relation to the figures. However, it should be understood that any appropriately shaped wheel may be used with the disclosed adaptable magnetic wheels as previously noted. Additionally while specific sensors types of sensors are not detailed relative to the control processes described below, it should be understood that any appropriate method of sensing the location of adjacent surfaces may be used as the disclosure is not so limited. For example, appropriate types of sensors that might be integrated with a vehicle for implementing the methods described herein may include look ahead sensors (e.g. infrared, radar, laser, optical, and other appropriate sensors), contact sensors, and/or any other appropriate sensor. Further, instances in which a vehicle is manually operated to perform the methods described herein without the use of any sensors are also contemplated. Accordingly, it should be understood that the currently disclosed vehicles and adaptable magnetic wheels are not limited to how the various methods are implemented either autonomously or manually.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
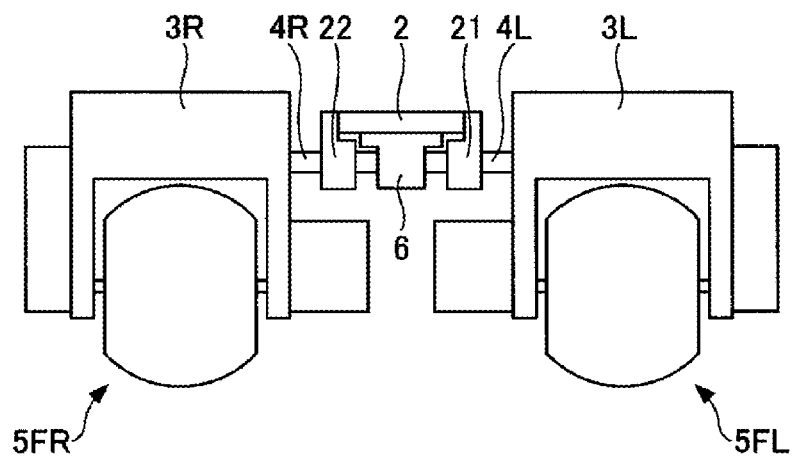
FIG. 2 is a front view of the vehicle of FIG. 1
Figure 3:
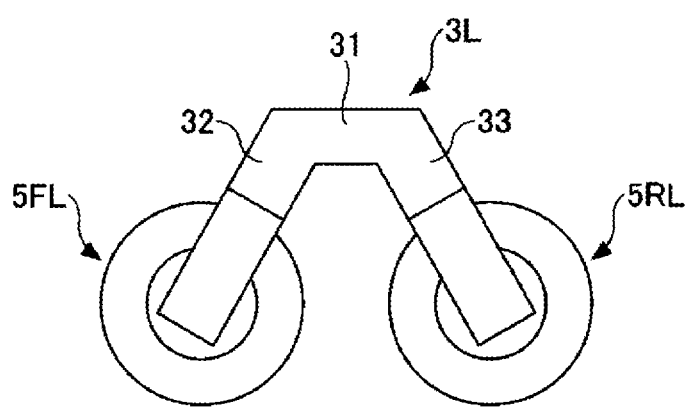
FIG. 3 is a side view of the vehicle of FIG. 1.

FIG. 1 is a perspective view of one embodiment of a vehicle 1 including adaptable magnetic ball-wheels. FIG. 2 is a front view of the vehicle of FIG. 1 and FIG. 3 is a side view of the vehicle of FIG. 1. As shown in FIGS. 1-3, vehicle 1 has a chassis 2, a left rocker arm 3L, a right rocker arm 3R, a left shaft 4L, a right shaft 4R, four magnetic attraction wheels 5 (front left 5FL, front right 5FR, rear left 5RL, rear right 5RR), and a differential gear 6. As will be discussed further with reference to FIGS. 4-5, the magnetic attraction wheels each include an internal magnet that is rotatable relative to a wheel it is positioned in. The magnets are configured to generate a magnetic attraction force to retain the vehicle on a ferromagnetic surface.

According to the embodiment of FIGS. 1-3, the chassis 2 may be equipped with a work attachment (not shown) for performing tasks including, but not limited to, welding, painting, visual inspection, and the like. In addition, the chassis 2 may be provided with a control unit (i.e., a processor configured to execute processor readable instructions stored in memory) for controlling the operation of the magnetic attraction wheels 5. In particular, the control unit may be configured to control a wheel drive motor 56 coupled to each of the wheels 5, and a magnet drive servomotor 57 coupled to each of the internal magnets, as will be discussed further below. In some embodiments, the vehicle 1 may include an associated user input device (e.g., tablet, mobile phone, computer, handheld controller, etc.) to accept the operator's operation. The user input device may be used in addition to or alternatively to the control unit to control the magnetic attraction wheels 5 based on input from a user (e.g., operator). In some embodiments, the control unit may control the magnetic attraction wheel 5 based on a program entered in advance and stored on memory onboard the chassis 2.

According to the embodiment of FIGS. 1-3, the vehicle 1 includes a non-elastic suspension formed by rocker arms 3L, 3R that allows all four wheels 5 to stay in contact with a non-level surface, even where each wheel has a contact point at a different inclination. The left and right rocker arms 3L, 3R are placed between the central chassis 2. A left shaft 4L is attached to the left rocker arm 3L, and is rotatably supported by a bearing 21 attached to the chassis 2. That is, the left rocker arm 3L and left shaft 4L are rotatably coupled to the chassis 2 with the bearing 21. Similarly, the right shaft 4R is attached to the right rocker arm 3R. The shaft 4R is supported by another bearing 22 coupled to the chassis 2 so that the right rocker arm and right shaft may rotate freely relative to the chassis. According to the embodiment of FIGS. 1-3, the left shaft 4L and the right shaft 4R are arranged coaxially. Additionally, the left shaft 4L and the right shaft 4R are connected via a differential gear 6. The differential gear allows the right rocker arm and left rocker arm to rotate in opposite directions, and the chassis 2 is inclined to an average angle between the left and right rocker arms.

As shown in FIGS. 1-3, the left rocker arm 3L may be formed in an inverted V-shape. The left rocker arm 3L has a central portion 31 to which the left shaft 4L is fixed, a forward portion 32 extending forward and downward from the central portion 31, and a rear portion 33 extending rearward and downward from the central portion 31. The forward portion 32 of the rocker arm 3L has a magnetic attraction wheel 5FL and the rear portion 33 has another magnetic attraction wheel 5RL. Accordingly, the left rocker arm is arranged with two wheels on opposite sides of a central portion rotatably attached to the chassis 2. Similarly, the right rocker arm 3R may be formed in an abbreviated inverted V-shape when viewed from the side. The right rocker arm 3R also has a central portion 34 in which the right shaft 4R is fixed, a forward portion 35 extending forward and downward from the central portion 34, and a rear portion 36 extending rearward and downward from the central portion 34. The forward portion 35 of the rocker arm 3R has a magnetic attraction wheel 5FR and the rear portion 36 has another magnetic attraction wheel 5RR. Accordingly, in the embodiment of FIGS. 1-2, the vehicle includes four wheels, with each wheel being positioned on the end of a rocker arm. Of course, while a specific inverted V-shape rocker arm is shown in FIGS. 1-3, any suitable shape for the rocker arms may be employed, as the present disclosure is not so limited.

According to the embodiment of FIGS. 1-3, the differential gear 6 has a first bevel gear (not shown) fixed to the end of the left shaft 4L, a second bevel gear (not shown) coaxially arranged with the first bevel gear and fixed to the end of the right shaft 4R, a third bevel gear (not shown) orthogonal to the shafts of the first bevel gear and the second bevel gear, and a frame (not shown) that supports the third bevel gear freely in rotation. The frame portion of the differential gear 6 is fixed to the chassis 2. The third bevel gear is connected to each of the first bevel gear and second bevel gear, such that rotation of either of the right shaft or left shaft rotates the third bevel gear. The differential gear 6 rotates the frame portion according to the average angle of rotation between the first bevel gear and the second bevel gear. Therefore, the rocker arm 3L and the rocker arm 3R can be individually oscillated in the vehicle 1 using the coaxially arranged shafts 4L, 4R as the oscillation axis. With this configuration, all four magnetic attraction wheels 5 (5FL, 5FR, 5RL, 5RR) can contact a magnetic attraction surface even if the magnetic attraction surface (the surface to be attached to) is a curved or uneven surface. In addition, in order to make all of the four magnetic attraction wheels 5 contact the magnetic attraction surface, the rocker arm 3L and rocker arm 3R can be individually oscillated. In some embodiments, instead of the differential gear 6, the rocker arm 3L and rocker arm 3R may be connected by another appropriate mechanism to allow the rocker arms to rotate relative to the chassis. Of course, alterative suspensions to that shown in FIGS. 1-3 may be employed, including, but not limited to, rocker-bogie suspensions and damped elastic suspensions, as the present disclosure is not so limited.

Figure 4:
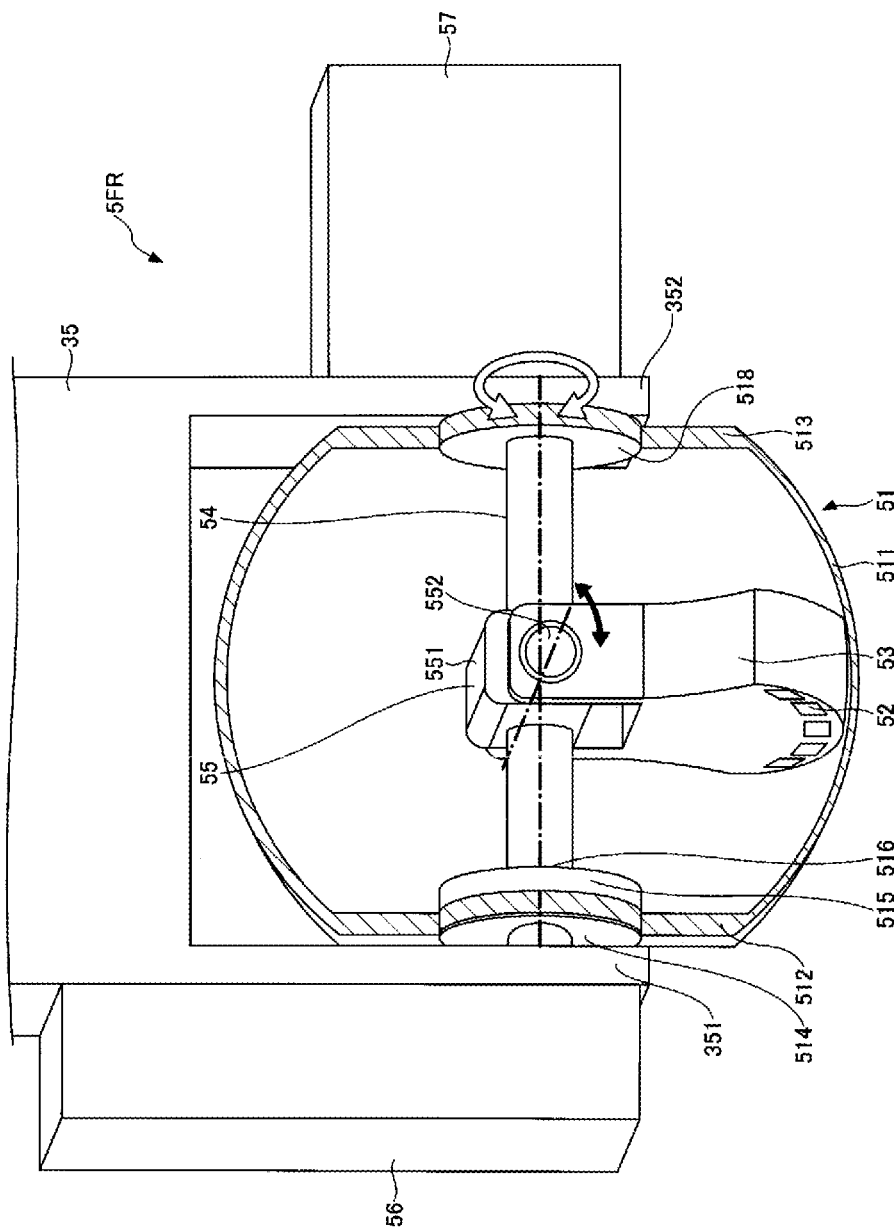
FIG. 4 is a cutaway view of one embodiment of a adaptable magnetic ball-wheel.
Figure 5:
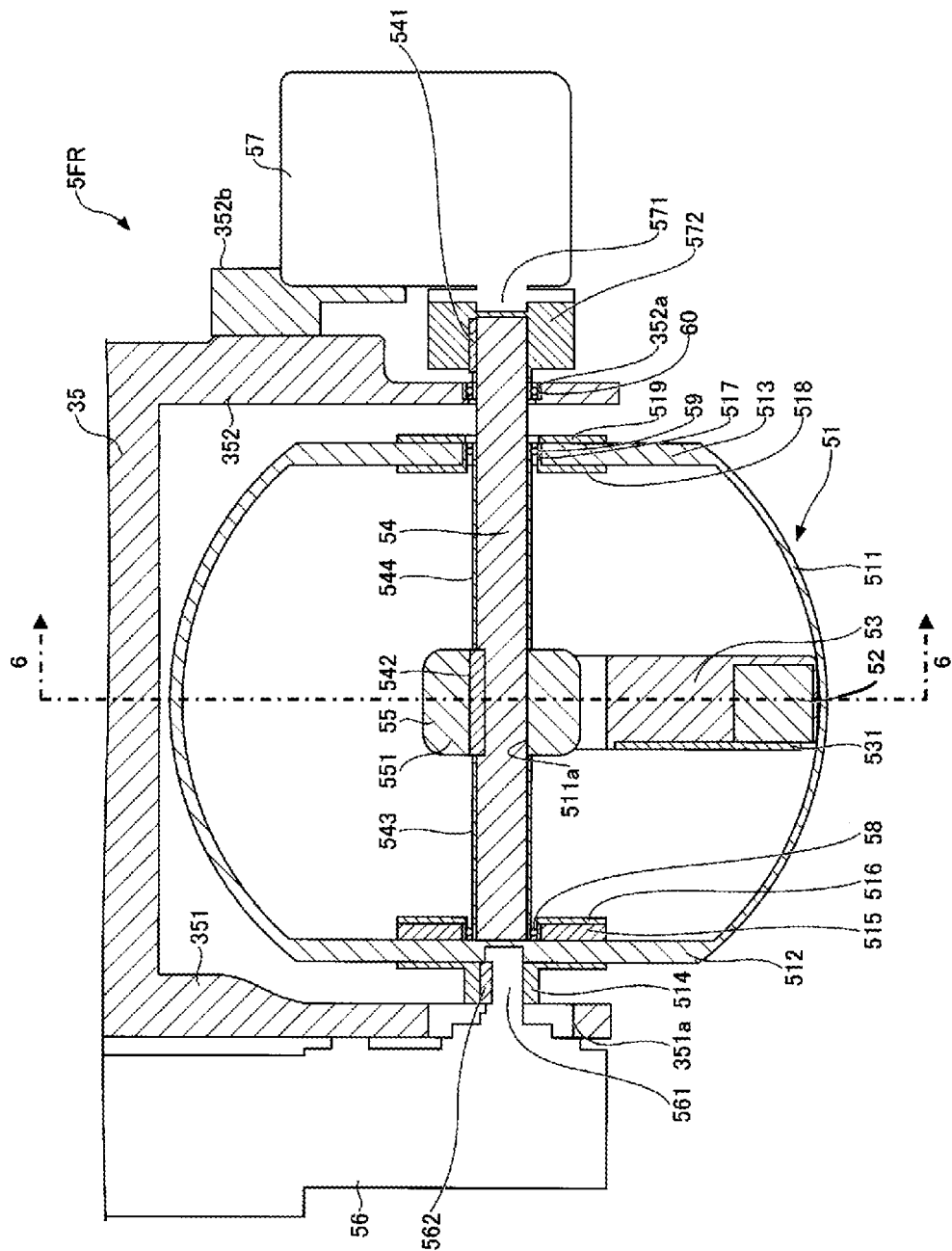
FIG. 5 is a cross-sectional view of the ball-wheel of FIG. 4.
Figure 6:
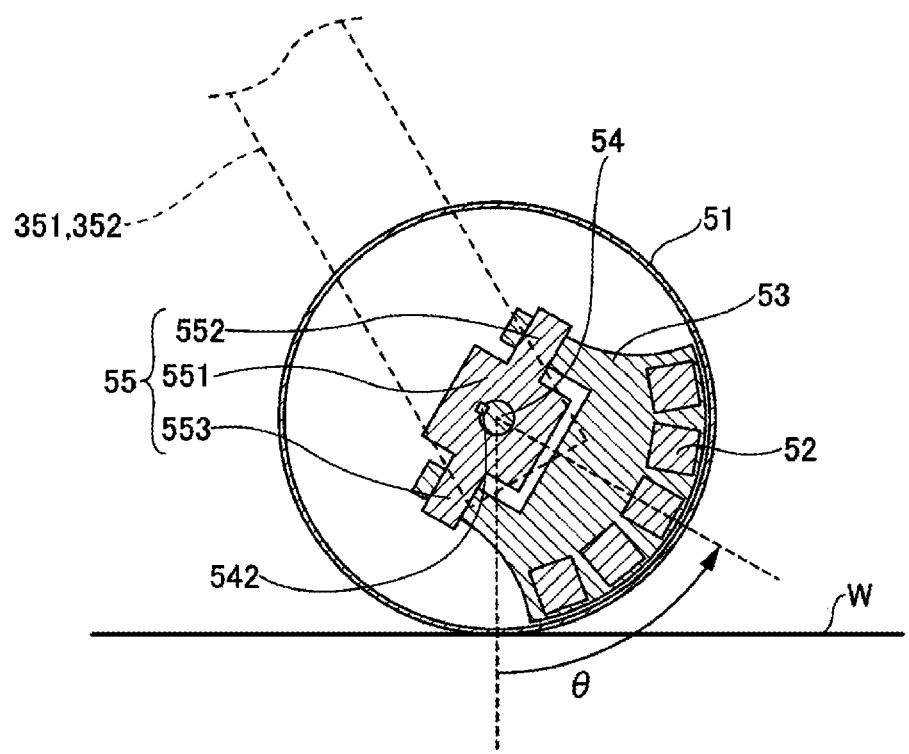
FIG. 6 is a cross-sectional view of the ball-wheel of FIG. 5 taken along line 6-6.

FIGS. 4-6 depict one embodiment of a magnetic attraction wheel 5 of the vehicle 1 shown in FIGS. 1-3. According to the embodiment of FIGS. 1-3, each of the four magnetic attraction wheels 5FL, 5FR, 5RL, and 5R of vehicle 1 have the same configuration. For this reason, the following explanation uses the front right magnetic attraction wheel 5FR as an example and omits the explanation of the magnetic attraction wheel 5FL, 5RL, and 5R. FIG. 4 is a cutaway view of the magnetic attraction wheel 5FR, FIG. 5 is a cross-sectional view of the magnetic attraction wheel 5FR, and FIG. 6 is a partially enlarged cross-sectional view of the magnetic attraction wheel 5FR taken along line 6-6 of FIG. 5. In FIG. 4, a portion of the wheel is removed so that the inner structure of the wheel can be seen. In addition, FIG. 5 shows a cross-sectional view of a first magnet shaft 54 cut in a vertical plane passing through an axial center. FIG. 6 shows a cross-sectional view cut in a plane perpendicular to the first magnet shaft 54.

According to the embodiment shown in FIGS. 4-6, the magnetic attraction wheel 5 consists of a wheel 51 that is at least partially spherical, a permanent magnet 52, a permanent magnet holder 53, a first magnet shaft 54, a second magnet shaft 55, a wheel drive motor 56, a magnet drive servomotor 57, and bearings 58-60. The wheel is supported by a bifurcated fork 351, 352 that is formed in the forward part 35 of a rocker arm 3R. The spherical wheel 51 has a hollow, abbreviated spherical shell shape. Specifically, the spherical wheel 51 has a spherical portion 511 and flat portions 512, 513. The spherical portion 511 is a surface that contacts a surface (e.g., a ferromagnetic surface) to allow locomotion of a vehicle. As shown in FIG. 4, planes 512 and 513 are planes perpendicular to an axis of rotation of the spherical wheel 51. Put another way, the external shape of the spherical wheel 51 has a shape in which the left and right sides are partially cut off from the spherical shape. The spherical wheel 51 is formed from a non-magnetic material such as aluminum, plastic, or composites, for example. In some embodiments, the spherical shell wheel 51 may include an outer coating of a high friction material (e.g., EVA, rubber, etc.) to assist with traction when adhered to a ferromagnetic surface.

According to the embodiment shown in FIGS. 4-6, the wheel drive motor 56 is fixed to the fork 351. An output shaft 561 of the wheel drive motor 56 penetrates a penetration portion 351a of the fork 351 and is fixed with the flat portion 512 of the spherical wheel 51. Specifically, in the depicted embodiment, a shaft holder 514 with a key groove is provided on the outside of the flat portion 512 of the spherical wheel 51. The shaft holder 514 is fixed to the spherical wheel 51 by a bolt, nut, etc. not shown. The output shaft 561 is fixed to the shaft holder 514 via the key 562. The wheel drive motor may be a DC motor, stepper motor, continuous servo, or another suitable actuator. Additionally, while the interface between the wheel drive motor and the spherical wheel 51 employs a key interfaced with a key groove, any suitable coupling between the wheel drive actuator and the wheel may be employed, as the present disclosure is not so limited.

According to the embodiment of FIGS. 4-6, the first magnet shaft 54 is arranged coaxially with the rotating shaft of the spherical wheel 51 (output shaft 561 of the wheel drive motor 56) and is supported freely by bearings 58, 59 attached to opposing portions of the spherical wheel 51. Accordingly, the first magnet shaft 54 is free to rotate relative to the wheel 51. In the specific arrangement shown in FIGS. 4-6, a circular member 515 and a holding member 516 are provided inside the flat portion 512 of the spherical wheel 51. The annular member 515 and the presser member 516 are fixed to the spherical wheel 51 by bolts, nuts, etc. not shown. The outer ring of the bearing 58 is disposed in the annular member 515 and is held in place by the presser member 516. The inner ring of the bearing 58 supports one end of the first magnet shaft 54. A through hole 517 through which the first magnet shaft 54 passes is formed in the flat portion 513 of the spherical wheel 51. A holding member 518 is provided inside the flat portion 513 of the spherical wheel 51. A holding member 519 is provided outside the flat portion 513 of the spherical wheel 51. The holding members 518, 519 are fixed to the spherical wheel 51 by bolts, nuts, etc. not shown. The outer ring of the bearing 59 is disposed in the through hole 517 and is retracted by the holding members 518, 519. The inner ring of the bearing 59 supports the first magnet shaft 54 that passes through the through hole 517. The fork 352 has a through hole 352a through which the first magnet shaft 54 also penetrates. The outer ring of the bearing 60 is disposed in the through hole 352a. The inner ring of the bearing 60 supports the first magnet shaft 54 that passes through the through hole 352a. The outer ring of the bearing 60 is positioned by contacting the fork 352 on the side of the spherical wheel 51 and the inner ring of the bearing 60 is in contact with the coupler 572 on the other side. Accordingly, the arrangement shown in FIGS. 4-6 allows the magnet holder 53 to pivot about an axis parallel to an axis of rotation of the spherical wheel 51.

According to the embodiment of FIGS. 4-6, the servomotor 57 for driving the magnet is fixed to the fork 352 via the bracket 352b. A coupler 572 is fixed to the output shaft 571 of the magnet drive servomotor 57. The other end of the first magnet shaft 54 is fixed to the coupler 572 via the key 541. The magnet servomotor 57 is capable of driving the first magnet shaft to corresponding rotate the magnet holder.

According to the embodiment of FIGS. 4-6, a second magnet shaft 55 rotating with the first magnet shaft 54 is provided inside the spherical wheel 51 to allow the magnet holder 53 to rotate in a second degree of freedom. In the specific embodiment of FIGS. 4-6, the second magnet shaft 55 has a base 551 and axial portions 552, 553. The base 551 has a through hole 551a through which the first magnet shaft 54 is inserted, and is fixed to the first magnet shaft 54 via the key 541. The axial portions 552, 553 are arranged coaxially and are orthogonal to the rotational axis of the first magnet shaft 54. A cylindrical collar 543, 544 is disposed on the first magnet shaft 54. The collar 543 has one end in contact with the inner ring of the bearing 58 and the other end in contact with the second magnet shaft 55. The collar 544 has one end in contact with the inner ring of the bearing 59 and the other end in contact with the second magnet shaft 55. As a result, the base 551 of the second magnet shaft 55 is positioned in the left-right direction. Specifically, the axes of the shaft portions 552 and 553 are positioned so that they pass through the center of the spherical wheel 51 (spherical portion 511). The permanent magnet holder 53 is suspended on the shafts 552, 553 of the second magnet shaft 55. In other words, the permanent magnet holder 53 can be oscillated with the shaft 552, 553 of the second magnet shaft 55 as the rotation axis. In addition, the permanent magnet holder 53 is configured to be rotatable with the first magnet shaft 54 as the axis. In this manner, the permanent magnet holder is movable in two degrees of freedom inside of the spherical wheel 51.

According to the embodiment of FIGS. 4-6, the permanent magnet 52 is embedded in the permanent magnet holder 53 and is disposed within the outer diameter of the wheel 51. For example, the permanent magnet 52 is housed in a recess provided in the permanent magnet holder 53, and is retracted by a holding member 531. The permanent magnet holder 53 has a fan-shaped shape along the inner surface of the spherical wheel 51. This allows the permanent magnet 52 to be as close as possible to the magnetic attraction surface. The permanent magnet 52 has, for example, five neodymium magnets arranged in an arc shape and disposed in the permanent magnet holder, as shown in FIG. 6. In addition, in some embodiments, a Halbach arrangement with five neodymium magnets may be employed to generate a strong magnetic force with a relatively small magnet volume. Of course, other arrangements of magnets within the spherical wheel are contemplated, as the present disclosure is not so limited. As shown in FIGS. 4-6, the permanent magnet holder 53 has a fan-shape or arc shape along the inner surface of the spherical wheel 51. The outer diameter of the permanent magnet holder 53 is formed to be less than or equal to the inner diameter of the spherical wheel 51. The outer surface of the permanent magnet holder 53 may be in contact with the inner surface of the spherical wheel 51 or may be separated from it in some embodiments. In the configuration where the outer surface of the permanent magnet holder 53 is in contact with the inner surface of the spherical wheel 51, a lubricant may be applied between the two surfaces to mitigate frictional resistance to the movement of the magnet holder 53.

As described above, the permanent magnet 52 held in the permanent magnet holder 53 is placed in the wheel 51 and rotates around the first magnet shaft 54 (in the first rotation direction, indicated by the white arrow in FIG. 4). It can be actively or passively rotated about the first axis defined by the first magnet shaft. Additionally, the magnet holder may rotatable about a second axis perpendicular to the first axis about the second magnet shaft 55 (in the second rotation direction, indicated by the double sided arrow in FIG. 4). In this manner, the magnet holder 53 is configured to be able to passively rotate to a position where the magnetic attraction force toward an adjacent ferromagnetic surface is strongest and the magnetic torque applied to the magnet 52 is effectively zero. The effect of the magnetic torque on the passive rotation of the magnet holder will be discussed further with reference to FIG. 7. In some embodiments, the magnet holder 53 may also be actively rotatable about the second magnet shaft 55, as the present disclosure is not so limited.

Figure 7:
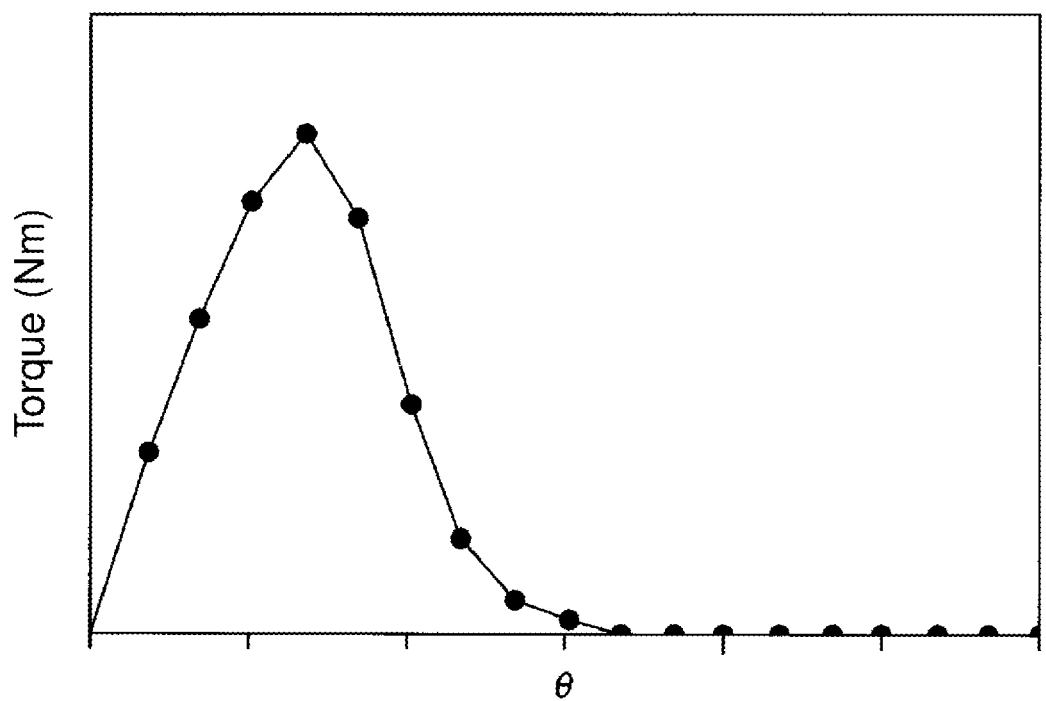
FIG. 7 is a graph showing an example of a relationship between the rotation angle of a magnet of the magnetic ball-wheel of FIG. 4 around a first magnet shaft and the rotation torque acted on a permanent magnet holder by the magnet.

FIG. 7 is a graph showing an example of the relationship between the rotation angle θ shown in FIG. 6 around the first magnet shaft 54 and the rotation torque acted on the permanent magnet holder 53 by the permanent magnet 52. Here, in the graph shown in FIG. 7, the horizontal axis indicates the rotation angle θ shown in FIG. 6 relative to when the permanent magnet 52 faces the direction of a ferromagnetic surface W at an angle θ=0°, and the vertical axis indicates the torque at that rotation angle. The torque acting on the permanent magnet holder 53 was determined from the magnetic attraction force calculated by a three-dimensional magnetic field analysis. In this example, a maximum value of torque may be 2.4 Nm. Therefore, for example, by using a magnet drive servomotor 57 with a stall torque of 6 Nm, the permanent magnet holder 53 can be rotated against the magnetic attraction force and the permanent magnet holder 53 can be moved away from the wall surface W. In other words, the magnetic attraction of the magnetic attraction wheel 5 to the wall surface W can be released. A magnet 52 and correspondingly servomotor 57, or other actuator, may be chosen such that such a maximum torque of the motor may be greater than a release torque of the magnetic attracted to a surface to allow a vehicle to traverse junctions and intersections between various surfaces.

FIGS. 8A-8D show examples of an arrangement of the permanent magnet 52 when the vehicle 1 of the present embodiment is attracted to a wall surface of various curved shapes. In the figures, the direction of the magnetic attraction force is indicated by the bolded arrows.

Figure 8A:
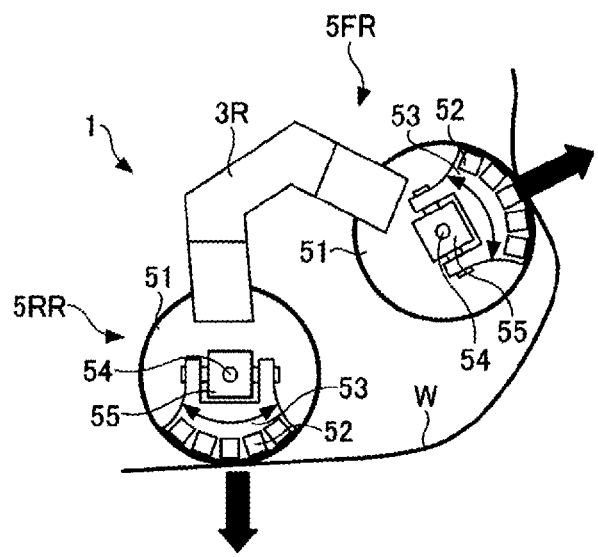
FIGS. 8A-8D are schematic diagrams of the vehicle of FIG. 1 depicting the arrangement of the magnets of the magnetic ball-wheels on various wall surfaces.

FIG. 8A shows the orientation of the permanent magnet 52 is attracting the vehicle 1 to a curved surface along the direction of travel of the vehicle 1. Here, the power supply to the magnet drive servomotor 57 is cut off, and the output shaft 571 (the first magnet shaft 54) of the magnet drive servomotor 57 is in a back-drive state that can be passively rotated by an external torque. The magnetic force of the permanent magnet 52 causes the permanent magnet holder 53 to be passively rotated around the first magnet shaft 54 so that the direction of the magnetic force of the permanent magnet 52 can be directed in the normal direction of the magnetic attraction surface. As a result, the permanent magnet holder 53 automatically achieves an arbitrary angle of orientation of the wall surface W, and the vehicle 1 can be attracted to the wall surface W. As a result, the permanent magnet holder 53 automatically achieves an arbitrary angle of orientation of the wall surface W, and the vehicle 1 maintains a consistent attraction force toward the wall surface W.

Figure 8B:
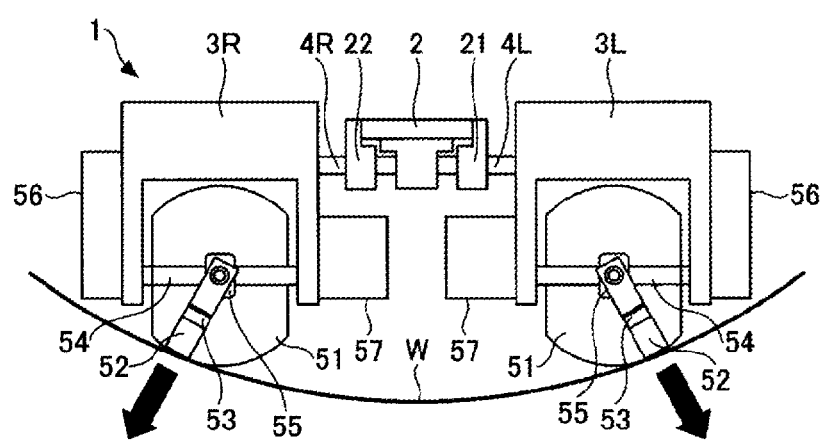

FIG. 8B shows the orientation of the permanent magnet 52 in attracting the vehicle 1 to a concave curved surface along the chassis width direction of the vehicle 1. By rotating the permanent magnet holder 53 with the second magnet shaft 55 as the rotation axis, the magnetic force direction of the permanent magnet 52 can be directed in the normal direction of the magnetic attraction surface passively.

Figure 8C:
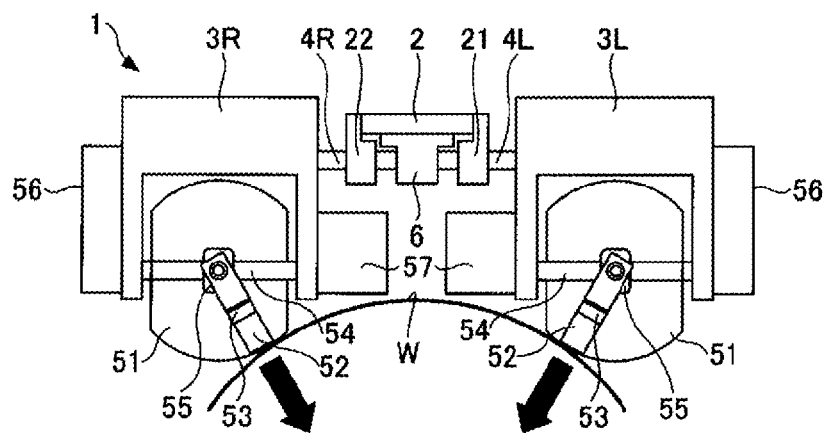

FIG. 8C shows the orientation of the permanent magnet 52 in attracting the vehicle 1 to a convexly curved surface along the width direction of the vehicle 1. By rotating the permanent magnet holder 53 with the second magnet shaft 55 as the rotation axis, the magnetic force direction of the permanent magnet 52 can be directed in the normal direction of the magnetic attraction surface passively.

Figure 8D:
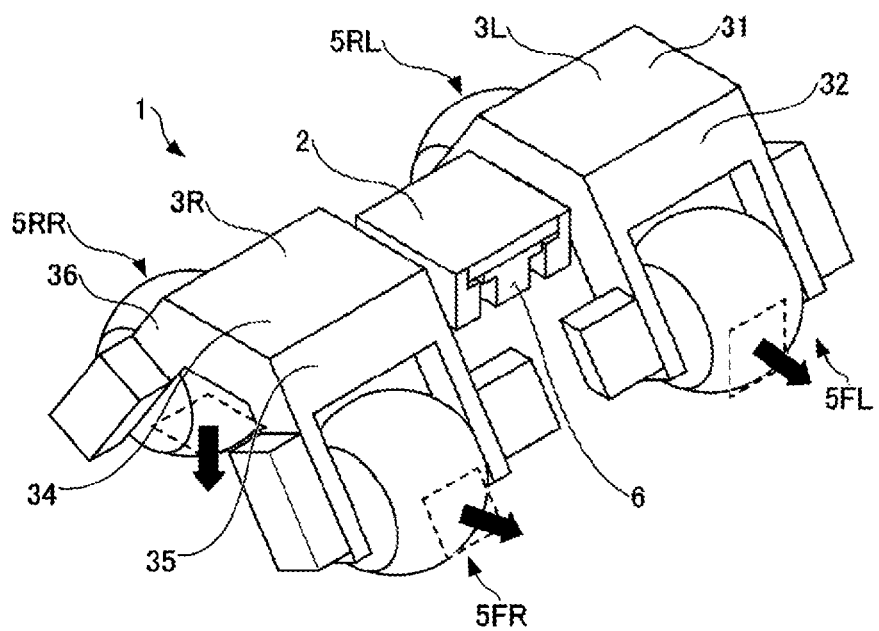

FIG. 8D shows the contact surfaces of all four wheels (shown as dashed lines) when the position and normal direction of the magnets are all different between the wheels corresponding to an irregular surface. The vehicle 1 has a rocker suspension as discussed previously, so that all four wheels can be attracted to the ferromagnetic surface even through the surface is not even and each wheel is accommodating a different pitch of the surface.

FIG. 9 is a flowchart showing one embodiment of a method of operating a vehicle including adaptable magnetic wheels. FIGS. 10A-10F depict one embodiment of a vehicle performing the steps of FIG. 9. The method shows the operation when the vehicle 1 moves from a floor surface W1 to a ferromagnetic wall surface W2. FIGS. 10A-10F are horizontal side views of the vehicle 1 as it traverses across and transitions between the surfaces.

In step S1, the control unit controls the servomotor 57 for the magnet drive so that the permanent magnet holders 53 of the front and rear wheels (magnetic attraction wheels 5FL, 5FR, 5RL, and 5RR) face the chassis 2 (see FIG. 10A). A control unit may control the servomotor 57 for the magnet drive so as to maintain the orientation of the permanent magnet holder 53 toward the chassis. In some embodiments, the chassis may include a ferromagnetic material that passively holds the magnet holder in an orientation toward the chassis, such that the servomotor may remain unpowered. In step S1, the control unit may also control the wheel drive motor 56 to drive the wheel 51 (see the white-extracted arrow in FIG. 10A). As a result, when the vehicle 1 travels on the floor surface W1, the increase in drive torque due to the magnetic attraction force toward the floor surface can be suppressed. In addition, the attraction of magnetic foreign substances such as iron sand on the floor surface W1 can be prevented. When the front wheels (magnetic attraction wheels 5FL, 5FR) reach the wall surface W2, the control unit stops the wheel drive motor 56 and proceeds to step S2.

In step S2, the control unit directs the permanent magnet 52 of the front wheel (magnetic attraction wheel 5FL, 5FR) toward the wall surface W2 (see black-painted arrow in FIG. 10B). In other words, the control unit may provide a control command to the magnet drive servomotor 57, or other actuator used to drive the magnet, to point the permanent magnet holder 53 toward the wall surface W2. This command may be embodied in a number of ways including a commanded velocity, torque, position, or other appropriate method of controlling an actuator for the magnet for the various control methods described herein. In this way, the permanent magnet 52 attracts the ferromagnetic wall surface W2. Thereafter, by shutting off the power supply to the servomotor 57 and setting the servomotor 57 in the back-drive state, the permanent magnet holder 53 rotates so that the magnetic direction of the permanent magnet 52 faces the wall surface W2 by the magnetic attraction force of the permanent magnet 52. That is, the magnet will adjust passively to maintain a normal orientation toward the wall, so that consistent magnetic attraction force is provided.

In step S3, the control unit controls the servomotor 57 to keep the rear magnet oriented toward the chassis 2 while driving the spherical wheel 51 by controlling the wheel drive motor 56 (see FIG. 10C). As a result, the front wheel that is magnetically attracted to the wall W2 will climb up the wall W2 (see FIG. 10C, the white-extracted arrow). The rear wheel on the floor surface W1 advances further toward the wall surface W2 (see FIG. 10C, white decoupled arrow). When the rear wheel reaches the wall W2 (see FIG. 10D), the control unit stops the wheel drive motor 56 and proceeds to step S4.

In step S4, the control unit directs the permanent magnet 52 of the rear wheel (magnetic attraction wheel 5RL, 5R) toward the wall surface W2 (see FIG. 10E). In other words, the control unit may provide a control command to the magnet drive servomotor 57 to point the permanent magnet holder 53 toward the wall surface W2. In this way, the permanent magnet 52 is attracted to the ferromagnetic wall surface W2. Thereafter, by shutting off the power supply to the servomotor 57 and setting the servomotor 57 of the rear wheels in the back drive state, the permanent magnet holder 53 rotates so that it is oriented towards the wall surface W2 and is attracted toward the wall surface by the magnetic attraction force of the permanent magnet 52. Following step S4, the vehicle may be attached to the wall surface W2 and may locomote by operating the drive motors 56 to drive the wheels while the magnets keep the vehicle adhered to the wall surface passively.

In step S5, the control unit controls the wheel drive motor 56 to drive the spherical wheels 51 (see FIG. 10F). During this motion, the front and rear wheels of the vehicle 1 are magnetically attached on the wall W2 and go up the wall W2 (see the white filled arrows in FIG. 10F). Thus, according to the embodiment described with reference to FIGS. 9-10, the vehicle 1 is capable of climb up the wall W2 from the state of being grounded on the floor surface W1.

Figure 12A:
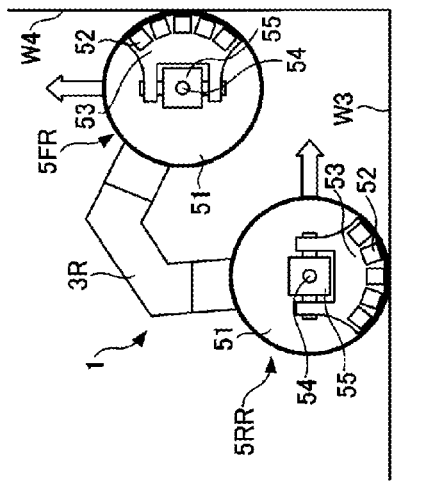
Figure 12B:
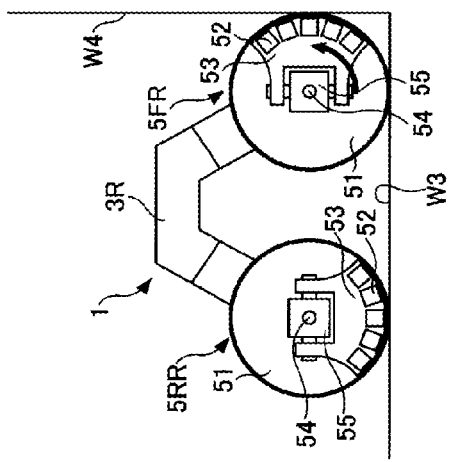
Figure 12C:
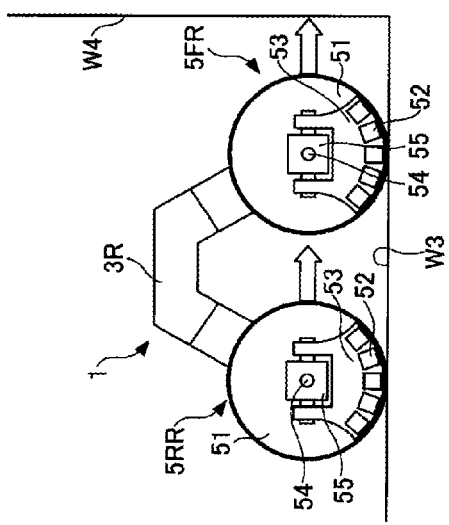

FIG. 11 is a flowchart showing another embodiment of a method of operating a vehicle including magnetic ball-wheels. In particular, the operation of vehicle 1 when vehicle 1 moves from one ferromagnetic wall surface to another is described using FIG. 11. FIG. 12 is a schematic diagram showing the state of the vehicle 1 as it performs the steps of FIG. 11 Furthermore, FIGS. 12A-12F depict a side view of the vehicle 1 as it traversers and transitions between the surfaces.

It should be noted that at the start, vehicle 1 is attracted to the first wall W3 as shown in FIG. 12A. That is, the permanent magnet holders 53 of the front and rear wheels (magnetic attraction wheels 5FL, 5FR, 5RL, 5RR) of the vehicle 1 are facing the first wall.

In step S21, the control unit controls the wheel drive motor 56 to drive the wheel 51 with the permanent magnet holder 53 of the front and rear wheels (magnetic attraction wheel 5FL, 5FR, 5RL, 5RR) facing the first wall surface W3 (see the white-out arrow in FIG. 12A). Here, by cutting off the power supply to the magnet drive servomotor 57 and setting the output shaft 571 (first magnet shaft 54) of the magnet drive servomotor 57 in the back drive state, the permanent magnet holder 53 rotates so that the magnetic direction of the permanent magnet 52 faces the first wall surface W3 due to the magnetic attraction force of the permanent magnet 52. As a result, the vehicle 1 can be attracted to the first wall W3 and locomote normally. When the front wheel (magnetic attraction wheel 5FL, 5FR) reaches the second wall surface W4, the control unit stops the wheel drive motors 56 and proceeds to step S2.

In step S22, the control unit directs the permanent magnet 52 of the front wheel (magnetic attraction wheel 5FL, 5FR) toward the second wall W4 (see black-painted arrow in FIG. 12B). In other words, the control unit may provide a control command to the magnet drive servomotor 57 to point the permanent magnet holder 53 toward the second wall W4. In this way, the permanent magnet 52 in the front wheel is attracted to the ferromagnetic second wall W4. Thereafter, by shutting off the power supply to the servomotor 57 and setting the output shaft 571 (first magnet shaft 54) of the servomotor 57 in a back-drive state, the permanent magnet holder 53 rotates so that the magnetic direction of the permanent magnet 52 faces the second wall surface W4 due to the magnetic attraction force of the permanent magnet 52.

During the process of step S22, the control unit directs one of the permanent magnets 52 of the front wheel (magnetic attraction wheels 5FL, 5FR) from the normal direction of the first wall surface W3 to the normal direction of the second wall surface W4. Next, the control unit directs the other side of the permanent magnet 52 of the front wheel (magnetic attraction wheels 5FL, 5FR) from the normal direction of the first wall surface W3 to the normal direction of the second wall surface W4. In other words, the vehicle 1 rotates the permanent magnet holder 53 of one wheel from a first orientation directed towards a first surface to a second orientation directed towards a second surface while at least three of the four wheels are attracted to the walls W3, W4. This may then be done sequentially for each wheel as the vehicle transitions between the surfaces. As a result, the vehicle 1 can be attracted to the wall W3 and/or W4 by at least three or more magnetic attraction wheels 5 to maintain sufficient attraction force to avoid falling from the walls when traversing the junction.

In step S23, the control unit controls the wheel drive motor 56 to drive the wheel 51 with the permanent magnet holder 53 of the front wheel (magnetic attraction wheel 5FL, 5FRR) facing the second wall W4 and the permanent magnet holder 53 of the rear wheel (magnetic attraction wheel 5RL, 5R) facing the first wall W3 (see FIG. 12C). In this way, the front wheel that is magnetically attracted to the second wall W4 advances along the second wall W4 (see the white-extracted arrow in FIG. 12C). The rear wheel on the first wall W3 advances further toward the second wall W4 (see FIG. 12C, the white decoupled arrow). When the rear wheel reaches the second wall W4 (see FIG. 12D), the control unit stops the wheel drive motor 56 and proceeds to step S24.

In step S24, the control unit directs the permanent magnet 52 of the rear wheel (magnetic attraction wheel 5RL, 5R) toward the second wall W4 (see FIG. 12E). In other words, the control unit may provide a control command to the magnet drive servomotor 57 to point the permanent magnet holder 53 toward the second wall W4. In this way, the permanent magnet 52 attracts the ferromagnetic toward the second wall W4. Thereafter, by shutting off the power supply to the servomotor 57 and setting the output shaft 571 (first magnet shaft 54) of the servomotor 57 in a back-drive state, the permanent magnet holder 53 rotates so that the magnetic direction of the permanent magnet 52 faces the second wall surface W4 due to the magnetic attraction force of the permanent magnet 52.

Here, the control unit directs one of the permanent magnets 52 of the rear wheels (magnetic attraction wheel 5RL or 5RR) from the normal direction of the first wall W3 to the normal direction of the second wall W4. Next, the control unit directs the other one of the permanent magnets 52 of the rear wheels (magnetic attraction wheel 5RL or 5RR) from the normal direction of the first wall W3 to the normal direction of the second wall W4. In other words, the vehicle 1 rotates the permanent magnet holder 53 of one wheel while at least three of the four wheels are attracted to the walls W3, W4. As a result, the vehicle 1 can be attracted to the wall W3, W4 by at least three or more magnetic attraction wheels 5 at all times during the transition.

In step S25, the control unit controls the wheel drive motor 56 to drive the spherical wheel 51 with the permanent magnet holder 53 of the front and rear wheels (magnetic attraction wheel 5FL, 5FR, 5RL, 5RR) facing the second wall W4 (see the white-extracted arrow in FIG. 12F). Thus, the front and rear wheels (wheels 5FL, 5FR, 5RL, and 5R) of the vehicle 1 are magnetically attached to the second wall W4 and may accordingly advance along the second wall W4 (see the white filled arrows in FIG. 12F).

It should be noted that while FIGS. 11 and 12 show the case where the vehicle 1 moves from wall to wall and is described as an example. For instance, the same method may be applicable to moving the vehicle 1 from a wall surface to a ceiling surface and from ceiling surface to a wall surface and/or any other junction between two adjacent surfaces. Alternatively, the vehicle 1 may be moved from the wall surface to a floor surface.

Figure 13:
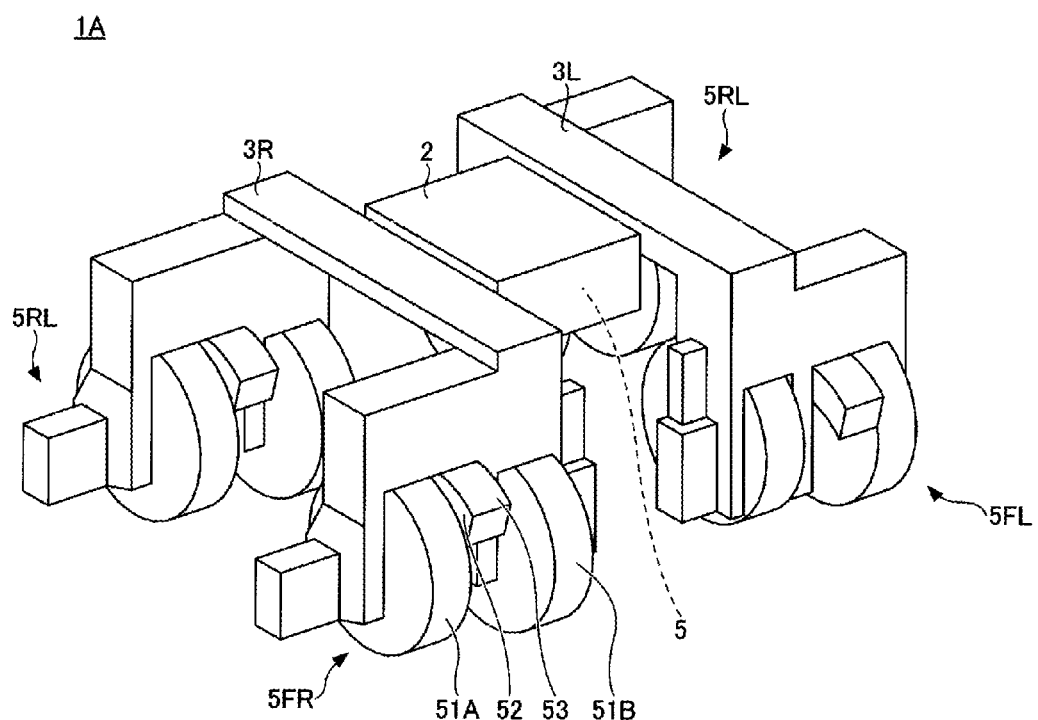
FIG. 13 is a perspective view of yet another embodiment of a vehicle including adaptable magnetic wheels.

FIG. 13 is a perspective view of yet another embodiment of a vehicle 1A including adaptable magnetic wheels. Compared with the vehicle 1 shown in FIGS. 1-3, the vehicle 1A has changed the shape of the wheel from a wheel 51 with an at least partially spherical shape to a cylindrical wheel 51A, 51B. In vehicle 1A, the permanent magnet holder 53 is disposed within the outer diameter of the wheels 51A, 51B and is fixed to the first magnet shaft 54. Such an arrangement may be appropriate if a ferromagnetic surface does not have curvature in the vehicle width direction. In the vehicle 1A shown in FIG. 13, the permanent magnet holder 53 can also be actively or passively rotated around the first magnet shaft 54. This enables the vehicle 1A to move between floor, wall, and ceiling surfaces, for example, as shown and described with reference to FIGS. 9-12.

Example: Prototype Vehicle Construction

To verify the functionality of the vehicle according to exemplary embodiments described herein, a vehicle prototype was developed. The prototype included a pair of rocker arms with magnetic spherical wheels and a center chassis. The prototype dimensions were 307 mm×480 mm×185 mm, and the weight was 7.4 kg. The combination of the rocker arm suspension and the magnetic spherical wheel was shown to achieve surface adaptability described herein. The vehicle was provided with four wheels. Each wheel consisted of two hemispherical aluminum shells, a magnet holder, and actuators. The thickness of the shell was 2 mm, its outer diameter was 127 mm, and the outer surface was coated with ethylene-vinyl acetate (EVA) to obtain sufficient friction between the wheels and the wall. A DC worm gear motor was directly connected to the shell. The self-locking feature of worm gear motors was selected to prevent the vehicle from falling down the wall when the electric power is lost. The magnet holder with neodymium magnets was located inside the shell and fixed to a shaft along the axis of wheel rotation. This shaft was directly connected to a servomotor and isolated from the wheel shell motion by using bearings. Additionally, the gap length between the magnet holder and the inner surface of the shell was 0.5 mm. Therefore, the magnet holder attached to the shaft was able to rotate independently of the wheel. The magnet holder orientation was able to be actively changed by using the servomotor, and it allowed the vehicle to turn on and off the magnetic force and change its direction by rotating the magnet holder. When the power supply to the servomotor was turned off, the servomotor became back-drivable, and the magnet holder was able to passively rotate to the direction that maximizes the magnetic force. The magnet holder was also provided with another rotational axis perpendicular to the servomotor shaft. This axis was a free rotational joint so that the magnet holder was able to passively move to make its direction normal to the wall surface. This second axis was used when the contact surface was not parallel to the axis of wheel rotation. Owing to the free rotational joint of the second axis, the magnet holder was able to fall down and contact the sidewall of the wheel shell because of the gravitational force. Such contact between the magnet holder and the wheel shell sometimes prevented the magnet/wheel from rotating smoothly. To avoid this mechanical contact, a small steel plate (60 mm×20 mm×4 mm) was placed on the bottom frame part. The magnet holder was attracted to the plate when it approached the initial position and prevented it from falling down.

The magnetic attraction force of the prototype was estimated by a static analysis of the force balance and moment balance when the vehicle is on a vertical wall (for example, see FIG. 10F). The required magnetic force at the wheel $F_{moment}$ was obtained as:

$$F_{moment} > l_1/2l_2 \, mg$$

where $l_1$ was the distance between the center of mass and the wall surface, $l_2$ was the distance between the front and rear wheels, m is the mass of the vehicle, and g is the gravitational acceleration. From the force balance, the required magnetic force $F_{force}$ was obtained as:

$$F_{force} > mg/4\mu$$

where $\mu$ is the friction coefficient between the wheel and the wall.

In this calculation, it was assumed that the vehicle weight is 8.0 kg, and the friction coefficient between the wheels and the steel wall is 0.5. $l_1$ is 101.3 mm and $l_2$ is 180 mm. By using these values, $F_{moment}$ and $F_{force}$ were found to be 22.1 N and 32.7 N, respectively. Because $F_{moment} < F_{force}$, 32.7 N was taken as the benchmark magnetic force. Using a safety factor of 2, the desired magnetic force was shown to be 65.4 N. To find a magnet configuration that can produce a force stronger than 65.4 N, a finite-element method (FEM) simulation by using Femtet was employed. It was found that N52 neodymium magnets (15 mm×15 mm×15 mm) placed in the holder and form a Halbach array was sufficient to generate the desired force. The EVA skin thickness was also evaluated for effect on magnetic attraction force. The magnetic force at 1.5 mm of the skin thickness was 63.6 N; thus, the EVA skin thickness in this particular example was shown to desirably thinner than 1.5 mm. If the skin thickness was 3 mm, the magnetic force was 46.2 N, and the safety factor degrades to 1.4. In the FEM simulation, the thickness of the steel plate to which the vehicle was attracted was 6 mm, based typical factory requirements.

Example: Prototype Vehicle Performance

The vehicle climbing ability was tested in some different situations. In the following tests, the vehicle was remotely operated by using a gamepad, and 12 V power was provided by an external power supply. The methods described with reference to FIGS. 9-12F were tested and the vehicle successfully performed the methods. The ability of the wheels to accommodate complex surfaces was also tested. A steel pipe was used as a convex wall to test the 2 DOF rotational mechanism. The outer diameter of the pipe was 406.4 mm, and the thickness was 7.9 mm. The vehicle was able to move along the surfaces in a straight line, and the wall shapes were considered to be uniform. To create a situation where the wall shape dynamically changes and the vehicle has to fully exert its rocker arm suspension and the 2 DOF rotational magnets, a turning motion was tested on the convex wall. During the task, four wheels were firmly attached to the pipe surface, and the vehicle performed a smooth movement. This result indicated that the vehicle is able to reliably travel on non-uniform curved surfaces. Because the vehicle has a rocker suspension mechanism, the vehicle was also shown to be able to climb up a small object on the ground. The maximum height of an object that the vehicle was shown to pass over was 50 mm, including multiple 50 mm objects simultaneously.

The payload capability of the prototype vehicle was also tested. The vehicle was able to support a 4 kg weight plate, and this was the maximum payload when the vehicle was on a vertical wall. The vehicle slipped down the wall if the payload was heavier than 4 kg. The maximum payload was 12 kg when the vehicle was on a ceiling. The actual magnetic force and the friction coefficient was estimated from these two payload values. The estimated magnetic force was 47.6 N, and the friction coefficient was 0.6. The thickness of the EVA skin on the wheel was approximately 2 to 3 mm.

The traveling speeds of the vehicle on a flat floor, the vertical flat wall, and the vertical convex wall were measured. In the measurement, an external constant voltage power supply was used to drive the wheels. The power supply has two output channels; therefore, two DC worm gear motors were connected to one channel. The output voltage was set to 12 V, and the current limit was 3 A for the two wheels. From the specification of the DC worm gear motor, the rotational speed with no load was 16 rpm, and the traveling speed of the vehicle using 127 mm diameter wheels was estimated to be 10.6 cm/s. The measurement results are summarized in Table 1. When the vehicle was on the flat floor, the traveling speed was 10.7 cm/s, which is the same as that given in the motor specs. Because the vehicle needs to support the vehicle weight while climbing up a wall, the traveling speed was slower than that on the ground. When the vehicle climbs down, the vehicle can utilize its weight to accelerate itself, and the speed becomes faster. The speeds of climbing up and down the convex wall are slower than those on a flat wall because the effective wheel radius becomes shorter on the convex surface.

TABLE 1

| Conditions | Traveling Speed |
| --- | --- |
| Traveling on a flat floor | 10.7 cm/s |
| Climbing up a vertical flat wall | 7.9 cm/s |
| Climbing down a vertical flat wall | 11.5 cm/s |
| Climbing on a vertical convex wall | 5.9 cm/s |
| Climbing down a vertical convex wall | 7.0 cm/s |

The present disclosures non-exhaustively include the subject matter set out in the following clauses:

Clause 1. A method of operating a vehicle, including:
 driving a plurality of wheels of the vehicle along a surface toward a wall orientated at an angle relative to the surface;
 orienting a front magnet positioned inside at least one front wheel of the plurality of wheels about a first front magnet axis in a direction orthogonal to the wall;
 driving at least one rear wheel of the plurality of wheels along the surface toward the wall;
 orienting a rear magnet positioned inside of the at least one rear wheel about a first rear magnet axis in a direction orthogonal to the wall; and driving the plurality of wheels of the vehicle along the wall.

Clause 2. The method of clause 1, wherein the at least one front wheel is two front wheels.

Clause 3. The method of clause 2, wherein the at least one rear wheel is two rear wheels.

Clause 4. The method of clause 1, further including adjusting the position of the four wheels with a suspension coupling the four wheels to a chassis of the vehicle.

Clause 5. The method of clause 4, wherein adjusting the position of the four wheels includes adjusting the angle of a first rocker arm relative to the chassis and adjusting the angle of a second rocker arm relative to the chassis.

Clause 6. The method of clause 1, wherein orienting the front magnet positioned inside of the at least one front wheel includes:
first, orienting the front magnet positioned inside of a first front wheel in a direction orthogonal to the wall;
second, orienting the front magnet positioned inside of a second front wheel in a direction orthogonal to the wall after the front magnet inside of the first front wheel is oriented in a direction orthogonal to the wall.

Clause 7. The method of clause 6, wherein orienting the magnet positioned inside of the at least one rear wheel includes:
first, orienting the magnet positioned inside of a first rear wheel in a direction orthogonal to the wall;
second, orienting the magnet positioned inside of a second rear wheel in a direction orthogonal to the wall after the magnet inside of the first rear wheel is oriented in a direction orthogonal to the wall.

Clause 8. The method of clause 1, further including orienting the front magnet positioned inside of the at least one front wheel about a second front magnet axis perpendicular to the first front magnet axis.

Clause 9. The method of clause 8, further including orienting the rear magnet positioned inside of the at least one rear wheel about a second rear magnet axis perpendicular to the first front magnet axis.

Clause 10. The method of clause 1, wherein orienting the front magnet about the first front magnet axis includes actuating a front actuator, and wherein orienting the rear magnet about the second front magnet axis includes actuating a rear actuator.

Clause 11. The method of clause 1, wherein the surface is a ground surface, and the wall is a vertical wall.

Clause 12. The method of clause 1, wherein the surface is a ceiling, and the wall is a vertical wall.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A vehicle comprising:
a chassis;
at least one wheel rotatably coupled to the chassis;
a wheel actuator coupled to the wheel and configured to selectively drive the wheel;
a magnet positioned inside of the at least one wheel, wherein the magnet is rotatably coupled to the at least one wheel via a first magnet shaft such that the magnet is rotatable relative to the wheel about a first axis; and
a magnet actuator coupled to the first magnet shaft, wherein the magnet actuator is configured to selectively adjust an angle of the magnet relative to the first axis, wherein the magnet is rotatably coupled to the at least one wheel via a second magnet shaft rotatably coupled to the first magnet shaft, such that the magnet is rotatable relative to the wheel about a second axis.

2. The vehicle of claim 1, wherein the second axis is perpendicular to the first axis.

3. The vehicle of claim 1, further comprising a suspension coupling the at least one wheel to the chassis.

4. The vehicle of claim 3, wherein the at least one wheel is four wheels, wherein the suspension is a rocker suspension having a first rocker arm coupled to two of the four wheels and a second rocker arm coupled to the other two of the four wheels, and wherein each of the first rocker arm and second rocker arm are rotatably coupled to the chassis.

5. The vehicle of claim 1, wherein the magnet actuator is a servomotor, and wherein the servomotor has a maximum output torque greater than a maximum magnetic attraction torque generated by the magnet.

6. The vehicle of claim 1, wherein the at least one wheel is at least partially spherical.

7. The vehicle of claim 1, wherein the at least one wheel is formed of a non-ferromagnetic material.

8. The vehicle of claim 1, wherein the magnet is a permanent magnet.

9. A vehicle comprising:
a chassis;
a wheel rotatably coupled to the chassis;
a wheel actuator coupled to the wheel and configured to selectively drive the wheel;
a plurality of magnets positioned inside of the wheel, wherein the plurality of magnets are rotatably coupled to the wheel via a first magnet shaft such that the plurality of magnets are rotatable relative to the wheel about a first axis; and
a magnet actuator coupled to the first magnet shaft, wherein the magnet actuator is configured to selectively adjust an angle of the plurality of magnets relative to the first axis,
wherein the plurality of magnets positioned inside of the wheel are arranged in a Halbach array.

10. A method of operating a vehicle, comprising:
controlling a wheel actuator of the vehicle to drive a plurality of wheels of the vehicle, the plurality of wheels being rotatably coupled to a chassis of the vehicle, the wheel actuator being coupled to each of the plurality of wheels to selectively drive each of the plurality of wheels; and
controlling a magnet actuator configured to selectively adjust an angle of a magnet relative to a first axis, the magnet being positioned inside each of the plurality of wheels, the magnet being rotatably coupled to each of the plurality of wheels via a first magnet shaft in such a manner as to be rotatable relative to each of the plurality of wheels about the first axis, the magnet being rotatably coupled to each of the plurality of wheels via a second magnet shaft in such a manner as to be rotatable relative to each of the plurality of wheels about a second axis, the second magnet shaft being rotatably coupled to the first magnet shaft, the magnet actuator being coupled to the first magnet shaft,
wherein said controlling the wheel actuator includes driving the plurality of wheels along a surface toward a wall orientated at an angle relative to the surface;

said controlling the magnet actuator includes orienting the magnet positioned inside of at least one front wheel of the plurality of wheels about the first axis in a direction orthogonal to the wall;

said controlling the wheel actuator includes driving at least one rear wheel of the plurality of wheels along the surface toward the wall;

said controlling the magnet actuator includes orienting the magnet positioned inside of the at least one rear wheel about first axis in the direction orthogonal to the wall; and said controlling the wheel actuator includes driving the plurality of wheels of the vehicle along the wall.

11. The method of claim 10, wherein the at least one front wheel is two front wheels.

12. The method of claim 11, wherein the at least one rear wheel is two rear wheels.

13. The method of claim 10, further comprising:

adjusting a position of the plurality of wheels with a suspension coupling the plurality of wheels to the chassis of the vehicle, the plurality of wheels being four wheels.

14. The method of claim 13, wherein said adjusting the position of the plurality of wheels includes adjusting an angle of a first rocker arm relative to the chassis and adjusting an angle of a second rocker arm relative to the chassis.

15. The method of claim 10, wherein said orienting the magnet positioned inside of the at least one front wheel includes orienting the magnet positioned inside of a first front wheel in the direction orthogonal to the wall; and orienting the magnet positioned inside of a second front wheel in the direction orthogonal to the wall after orienting the magnet inside of the first front wheel in the direction orthogonal to the wall.

16. The method of claim 15, wherein said orienting the magnet positioned inside of the at least one rear wheel includes orienting the magnet positioned inside of a first rear wheel in the direction orthogonal to the wall; and orienting the magnet positioned inside of a second rear wheel in the direction orthogonal to the wall after orienting the magnet inside of the first rear wheel in the direction orthogonal to the wall.

17. The method of claim 10, wherein said controlling the magnet actuator further includes orienting the magnet positioned inside of the at least one front wheel about the second axis perpendicular to the first axis.

18. The method of claim 17, wherein said controlling the magnet actuator further includes orienting the magnet positioned inside of the at least one rear wheel about the second axis perpendicular to the first axis.

19. The method of claim 10, wherein the magnet actuator includes a front magnet actuator configured to selectively adjust the angle of the magnet positioned inside of the at least one front wheel relative to the first axis and a rear magnet actuator configured to selectively adjust the angle of the magnet positioned inside of the at least one rear wheel relative to the first axis, and said orienting the magnet positioned inside of the at least one front wheel includes actuating the front magnet actuator, and said orienting the magnet positioned inside of the at least one rear wheel includes actuating the rear magnet actuator.

20. The method of claim 10, wherein the surface is a ground surface or a ceiling, and the wall is a vertical wall.

* * * * *